United States Patent

[11] 3,574,914

| [72] | Inventor | Neil A. Carter |
| | | Danville, Calif. |
| [21] | Appl. No. | 862,545 |
| [22] | Filed | June 12, 1969 |
| | | Division of Ser. No. 706,322, Feb. 19, 1968, Pat. No. 3,460,580. |
| [45] | Patented | Apr. 13, 1971 |
| [73] | Assignee | Cenco Instruments Corporation |
| | | Chicago, Ill. |

[54] METHOD OF FABRICATING A BAFFLE ASSEMBLY
2 Claims, 8 Drawing Figs.

[52] U.S. Cl. ................................................. 29/157R,
29/159B, 29/460, 29/527.3, 29/527.4
[51] Int. Cl. ............................................. B21d 53/00,
B21k 29/00
[50] Field of Search ................................................. 138/42;
417/153; 29/527.1, 527.3, 527.4, 159 (B), 460, 157 (R)

[56] References Cited
UNITED STATES PATENTS

| 1,031,515 | 7/1912 | Bluemel et al. | 29/159B |
| 1,311,684 | 7/1919 | Fitch | 164/111 |
| 1,475,602 | 11/1923 | Sheller | 264/239 |
| 3,051,452 | 8/1962 | Nobel | 138/42X |
| 3,192,609 | 7/1965 | Murata et al. | 29/460X |

Primary Examiner—John F. Campbell
Assistant Examiner—D. C. Reiley
Attorney—Robert E. Wagner ABSTRACT: A baffle assembly having good diffusion characteristics formed by baffle plates inserted into angularly disposed slots extending inwardly from opposite ends of a supporting ring. The baffle plates may be sealingly locked into position by encapsulation, for example, by casting a second ring around the supporting ring. Each baffle plate has the inner edge in opposition to a side face of an opposed plate to assure maximum diffusion while not materially increasing resistance to flow. A baffle assembly cooling arrangement is also shown.

Patented April 13, 1971
3,574,914
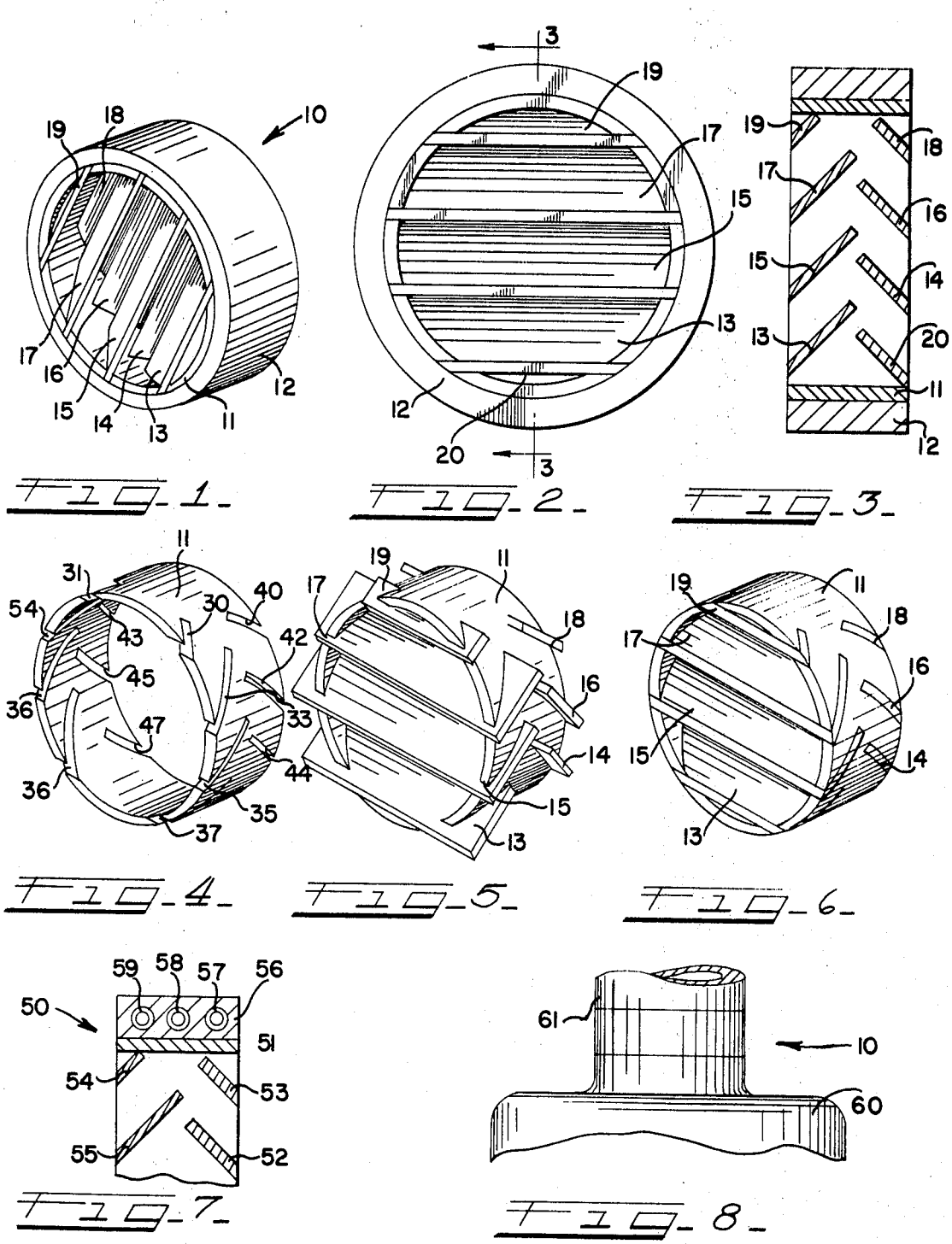
INVENTOR
NEIL A. CARTER
BY Robert E. Wagner
ATT'Y.

METHOD OF FABRICATING A BAFFLE ASSEMBLY

This application is a division of my copending application, Ser. No. 706,322, filed Feb. 19, 1968, now U.S. Pat. No. 3,460,580.

This invention relates to diffusers or baffle assemblies particularly adapted for use in vacuum systems and the like.

Vacuum systems, especially those capable of producing high vacuums, have found many uses in industry and scientific applications. In a typical system which is used to produce high vacuums in applications such as vacuum coating of metals, insulating electronic components and transformers, potting under vacuum, vacuum dehydration of blood plasma, foods, etc., and coating of lenses, to mention a few, a vacuum pump is used in combination with a diffusion pump. In an analog or schematic of a system of this type, the vacuum chamber may be formed by a bell jar or the like positioned over a pump plate and the interior of the chamber may be joined to the diffusion pump through a cold trap and baffle. In some instances, the cold trap may be omitted. The vacuum chamber is also connected to the fore pump or vacuum pump through a separate line, which line may be joined to the outlet end of the diffusion pump just ahead of the inlet to the vacuum pump. Suitable valving is provided to control the path of evacuation, as after "roughing," the final vacuum is applied by an oil diffusion pump.

As is well known, the oil diffusion pump is a rather basic element for high-volume vacuum technology. One of the problems which exists in using a pump of this type is the diffusion of the hot oil vapor back into the vacuum chamber. This is commonly referred to as "backstreaming" and has been sought to be avoided by introducing a tortuous path between the diffusion pump and the system. This has been done by simply placing a bend in the line from the diffusion pump to the pump plate or, in the more sophisticated applications, through the insertion of a baffle assembly.

Prior to the present invention, such baffle assembly generally consisted of a housing having a plurality of chevron-shaped baffle plates welded in alignment with some overlap to produce an optical baffle. The positioning and welding of the individual plates was cumbersome, time consuming and comparatively speaking, expensive. The resulting baffle assembly could be air or liquid cooled. It was possible in such a design for oil molecules or droplets to pass through the baffle without actually contacting the baffle plates. Naturally, the passages may not be too tortuous or they will adversely affect the effective speed of the pump. Nonetheless, this consideration must be balanced against the need for an effective baffle or barrier which will prevent backstreaming.

The present invention relates to a new and improved baffle assembly and method of forming the same. The novel arrangement of the baffle plates provides a more effective baffle assembly to minimize the possibility of backstreaming while not materially affecting the effective speed of the diffusion pump. In the present baffle assembly, the baffle plates are formed from flat stock, being mounted in a base ring, arranged with the inner ends in opposition to a side face of an opposing baffle plate which is inserted from the opposite side of the ring. This will become more apparent upon consideration of a summary of the method by which the novel baffle assembly is made. The base ring, which may be of annular or rectangular form, is provided with a plurality of slots which are angulated relative to the axis of the ring. The slots extend longitudinally from opposite ends of the ring toward a plane intermediate the ends, however, the slots, because of the angulated arrangement, terminate short of each other. This provides for good ring rigidity while also establishing a pattern for accurate insertion of the baffle plates. Into the slots are inserted a plurality of baffle plates which are of generally rectangular form. The plates may be trimmed to a suitable length prior or after insertion and the entire subassembly, consisting of the base ring and inserted and trimmed plates, receives a second ring which is cast around the periphery of the base ring. This serves to encapsulate the base ring and locks the baffle plates rigidly in the slots. If desired, the encapsulating ring may include a plurality of cooling passages adapted for attachment to a source of cooling fluid.

The novel pattern of arranging the baffle plates provides for good diffusion and assures contact of a maximum number of molecules of the gas being evacuated. Any oil vapor striking the cooled baffles will condense and return by gravity to the diffusion pump. The total baffle plate area may be increased over the area available with the chevron-type baffle for a comparable axial thickness. Greater heat conductance is provided with the ends of the baffles embedded in the second ring which is cast around the base ring. The novel manufacturing method permits the use of diverse materials for the baffle, base ring and encapsulating ring. The novel ring and method of forming provides other advantages in the form of reduced cost, greater ease in manufacture and assembly and choice of materials. Other advantages will become apparent upon consideration of the objects achieved.

It is an object of this invention to provide a new and improved baffle assembly having better diffusion characteristics.

It is a still further object of this invention to provide a new and improved baffle assembly having uniquely mounted and arranged baffle plates to improve diffusion while not materially increasing the resistance to flow.

It is a still further object of this invention to provide a new and improved method of forming baffle assemblies of an improved type in a novel manner.

It is a still further object of this invention to provide a new and improved process for forming a baffle assembly which is economical and permits flexibility in the choice of the materials used.

Other objects of this invention will become apparent upon reference to the accompanying drawings and attendant description.

In the drawings:

FIG. 1 is a perspective view of a baffle illustrating the features of the present invention;

FIG. 2 is an enlarged elevational view of the baffles shown in FIG. 1;

FIG. 3 is a cross-sectional view taken generally along the line 3-3 of FIG. 2;

FIG. 4 is a perspective view on a reduced scale of the base ring used in forming the baffles after slotting;

FIG. 5 is the base ring of FIG. 4 after insertion of the baffle plates;

FIG. 6 is the ring of FIG. 5 after the ends of the plates have been trimmed;

FIG. 7 is a fragmentary cross-sectional view of a modified form of a baffle assembly; and FIG. 8 is a fragmentary elevational view of the baffle assembly of FIG. 1 installed in a line extending from the pump plate to the diffusing pump.

Referring now to FIG. 1, reference numeral 10 indicates a baffle assembly formed in accordance with the principles and method of the present invention. The baffle assembly 10 consists of a base or mounting ring 11 and encapsulating ring 12 and a plurality of baffle plates 13, 14, 15, 16, 17, 18, and 19, and 20 (visible in FIG. 3 only).

As is apparent in the elevational view of FIG. 2 and cross-sectional view of FIG. 3, the optical path presented by the baffle plate arrangement assures that fluid passing through the baffle assembly will contact at least one of the baffle plates and, in most instances, more than one plate. If the baffle assembly is air-cooled, the temperature of the fluid passing through may be modified to approach that of the ambient or, if an artificial coolant is supplied, that of the coolant.

A better understanding of the construction of the baffle assembly will be had upon consideration of the method of forming the same. FIGS. 4—6 illustrate the sequential steps used in forming a baffle subassembly which may be finally encapsulated and machined to the form of FIGS. 1—3. As illustrated in FIG. 4, a plurality of opposed slots 30 and 31, 33 and 34, 35 and 36, 37 and 38 are formed in one end of the mounting ring 11. As is apparent, the opposed slots 30 and 31 and adjoining pairs are formed at an angle to the longitudinal axis or axis of revolution of the base or mounting ring 11 and are generally parallel to each other. Corresponding pairs of slots are formed in the opposite end of the ring extending inwardly and being indicated at 40, 41 (not shown), 42 and 43, 44 and 45, 46 (not shown) and 47. The slots formed in the opposite end of the ring are disposed at an angle which may be normal to the angle of the slot on the opposing edge and are generally parallel to each other. This may be readily observed by reference to the cross-sectional view of FIG. 3.

It can be appreciated that the slots are readily formed by any suitable means such as milling, sawing or the like, with opposite aligned slots formed simultaneously. After the slots have been formed, the baffle plates are inserted as illustrated in FIG. 5. If desired, the plates may be trimmed to length in advance of the insertion step or, in the alternative, plates of the general length may be inserted with opposite ends projecting beyond the periphery of the base or mounting ring 11 as shown in FIG. 5.

The relationship of the width of the slot to the thickness of the baffle plate may be such that the plates are held in place by the interference of the sides with the sides of the slot. If the plates extend beyond the periphery of the base ring as shown in FIG. 5, they may be subsequently trimmed to length to form an assembly of the type shown in FIG. 6 with the ends of the respective baffles circumferentially coextensive with the periphery of the base ring 11 and forming a completed baffle subassembly.

In the usual case, it is desirable to encapsulate the subassembly to firmly secure and seal the baffle plates to the base ring 11. This may be conveniently accomplished by molding or casting an outer ring, shown at 12 in FIGS. 1—3, around the subassembly of FIG. 6. In the illustrated form of the invention, the encapsulating ring 12 was formed of cast aluminum subsequently machined to the annular shape shown. Obviously, the ring configuration may be changed to any desired shape such as oval, rectangular or the like without departing from the inventive principles.

Upon completion of the encapsulation, the baffle plates are securely locked into the base ring and the ends securely sealed against air leakage. If desired, each of the baffles may project slightly beyond the circumference or outer periphery of the ring 11 which assures that they will be rigidly held on molding or casting the encapsulating ring 12 around the base ring 11.

A modified form of the invention is shown in FIG. 7 fragmentarily at 50, having a base or mounting ring 51 of the type described above and baffles 52, 53, 54 and 55 which are disposed and arranged in accordance with the baffles shown in FIGS. 1—6. The embodiment of FIG. 7 differs from the embodiment shown above in that the encapsulating ring 56 is formed with a plurality of passages or conduits 57, 58 and 59. These conduits are in communication with each other with external connections (not shown) provided to permit fluid to be circulated through the encapsulating ring. If desired, the conduits 57—59 may be located in direct circumferential contact with the mounting or base ring 51 or the ends of the baffle plates for good heat-conducting relation and greater cooling efficiency. In this manner, the baffle plates may be brought to any desired temperature by circulating a refrigerant or artificial cooling medium through the conduits. As a suitable alternative, the conduits may be formed of a suitable tubing helically wound about the base ring in advance of the encapsulation step.

A typical application of the baffle assembly 10 is shown in schematic form in FIG. 8. The baffle assembly 10 is positioned between a diffusing pump 60 and a conduit 61 which leads to the pump plate forming a part of the vacuum chamber. The baffle assembly 10 is located at the inlet end of the diffusing pump 60 and is located so that any backstreaming fluid will strike the baffle plates, condense on the baffle plates, and drip back into the diffusing pump under the force of gravity. Thus, the vacuum chamber will be free of contamination from the diffusion pump.

It can be appreciated that the baffle assembly of the present invention, while providing an extremely dense optical path, does not severely impede the actual flow through the baffle. The inner edge of each of the plates is in opposed relation to the side face of the plate on the opposite side of the mounting ring 11. While these are shown to be on geometric axes which are approximately normal to each other, they can be varied and not depart from the principles of the present invention. As can be appreciated from the illustration in FIG. 3, these geometric axes will intersect. Because of the location and angularity of the plates, a greater cooling area is provided within the axial limitations on ring thickness and, therefore, better diffusion and cooling is obtained when compared to the chevron-type diffuser discussed above. Also, the use of diverse materials in the manufacture of the ring is permitted for maximum economy and greater ease of machining. The method of manufacturing the baffle assembly is much more convenient than the former brazing or welding techniques which were commonplace in forming the herringbone design.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. The method of forming a baffle assembly, said method comprising slotting a ring at opposite axial ends with a pair of generally parallel and spaced slots, said slots extending at an angle relative to the axis of said ring, inserting opposite ends of a baffle plate in each pair of said slots, and casting a second ring around said slotted ring to rigidly hold said baffle plates in place.

2. The method of claim 1 wherein the opposite end portions of each of said baffle plates projects beyond the outer periphery of said slotted ring and said second ring be cast around said first slotted ring to a depth at least equal to the projecting part of the end portion of said baffle plate to hold said baffle plate in place.